United States Patent

[11] 3,629,567

[72] Inventor Harro Bruggemann
Glen Iris, Victoria, Australia
[21] Appl. No. 855,543
[22] Filed Sept. 5, 1969
[45] Patented Dec. 21, 1971
[73] Assignee The Commonwealth of Australia, c/o The Postmaster Generals Department Research Laboratories
Melbourne, Victoria, Australia
[32] Priority Sept. 15, 1968
[33] Australia
[31] 43033/68

[54] ANALOGUE MULTIPLIER
26 Claims, 12 Drawing Figs.

[52] U.S. Cl. 235/194, 307/229, 328/160
[51] Int. Cl. G06g 7/16
[50] Field of Search 235/194, 195, 196, 193, 197; 328/160, 161; 307/229, 230

[56] References Cited
UNITED STATES PATENTS

| | | | |
|---|---|---|---|
| 3,393,307 | 7/1968 | Courtenay et al. | 235/194 X |
| 3,443,079 | 5/1969 | Nathan | 235/194 |
| 3,466,460 | 9/1969 | Connolly | 235/194 X |

*Primary Examiner*—Joseph F. Ruggiero
*Attorney*—Ward, McElhannon, Brooks & Fitzpatrick

ABSTRACT: An analogue multiplier stage which in use receives a first input signal represented by a pair of input currents and comprises a pair of current forks which divide the input currents in a predetermined ratio, the outputs the forks being cross-connected in one configuration to produce an output signal represented by a pair of output currents from the stage and representative of a product of the input signal and a term involving the ratio, and the fork outputs being cross-connected in the alternative configuration to produce a feedback signal which can be used to control the ratio by comparison with a second input signal.

ANALOGUE MULTIPLIER

Figures 1A, 1B, 1C:
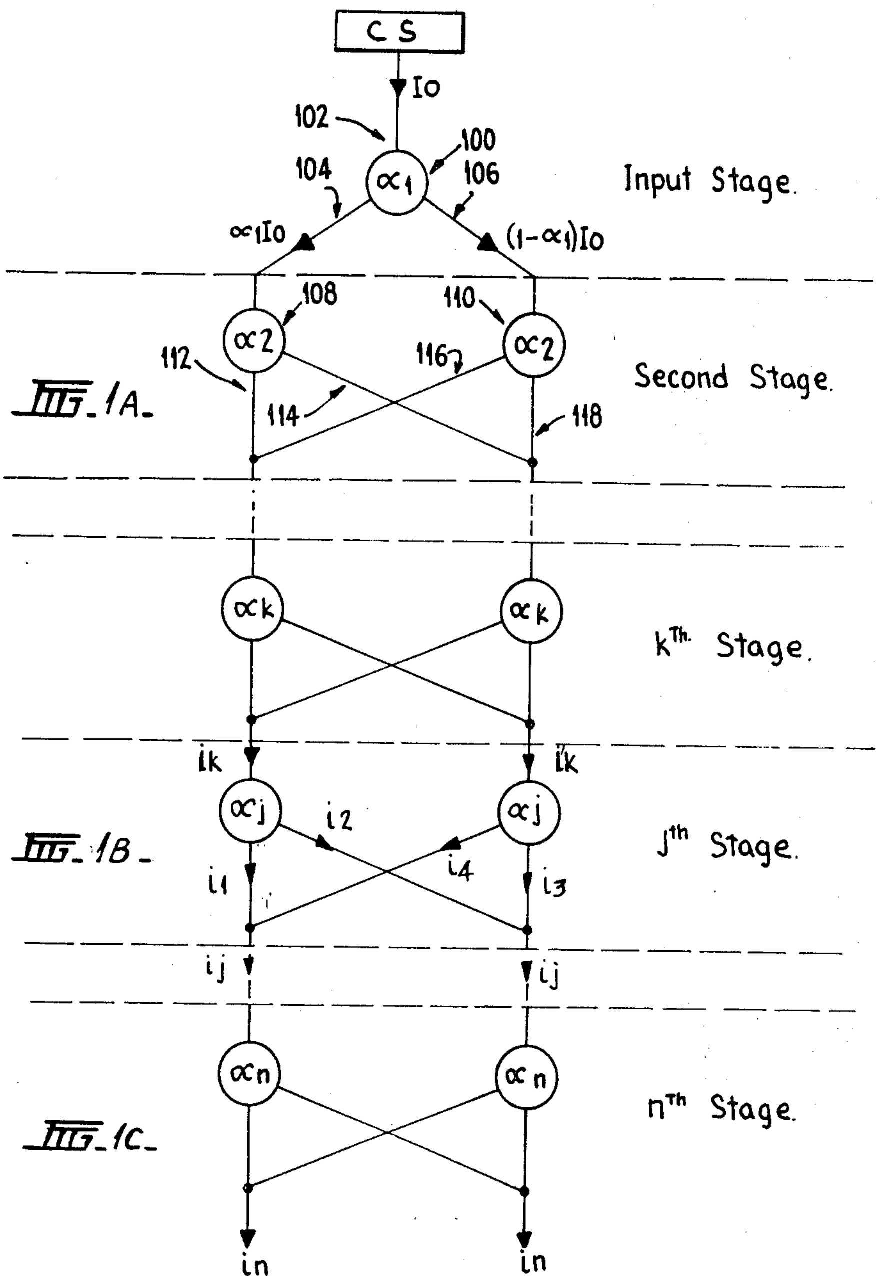

The present invention relates to equipment for use in analogue multiplication and particularly, but not exclusively to equipment employing electrical analogues.

Whenever the need for a reasonably accurate electronic analogue multiplier arises, systems designers are generally compelled to choose from the following two types:

i. The quarter square multiplier which utilizes two square-law devices to obtain the product of two input quantities $x$ and $y$ according to the equation:

$$4xy=(x+y)^2-(x-y)^2$$

ii. The time-base multiplier, which operates on the principle that when a pulse is amplitude modulated proportional to one input quantity and width modulated proportional the other input quantity, then the area of the pulse is a direct measure of the product of the two input quantities and may be obtained by measuring the mean value of a train of such pulses.

Commercially available analogue multipliers are generally closely related to one or the other of these two types. Their static accuracies are typically of the order of a fraction of a percent, the time-base type being usually superior in this respect. Bandwidths are of the order of tens of kHz, the quarter-square type generally giving a better performance.

Implementation of either of the above techniques to realize an analogue multiplier having a given performance can be an extremely tedious task, frequently resulting in an awesome array of hardware.

The difficulty encountered in design is due to the necessity to use some nonlinear element or process (as implied by the principle of superposition), and the accuracy of a multiplier is limited by the deviation of the behavior of the nonlinear element from its ideal behavior.

In the past few years, a number of techniques utilizing the very predictable exponential characteristics of the emitter-base junction of the bipolar transistor have been exploited to generate the product of two variables. One such technique is based on the slide-rule principle, whereby logarithms and antilogarithms are obtained directly. The basis of an alternative known technique employing the bipolar transistor is described with reference to FIG. 1 hereof as an introduction to the illustrated embodiments of the present invention. However, in general, transistor multipliers of this type suffer from at least one of the following limitations:

1. Dependence on transistor parameters.
2. Nonlinear behavior with respect to one or both inputs.
3. Temperature dependence of the product coefficient.
4. Low signal-to-noise ratios at low output levels.
5. Limited bandwidth.
6. Excessive DC drift on the output.

It is an object of the present invention to permit design of a multiplier which will overcome at least one of the above disadvantages, or at least reduce it to acceptable limits.

According to a first aspect of the invention, there is provided equipment for use in analogue multiplication comprising

- apparatus to receive a first input signal represented by a difference between first and second input signal components and to produce in response thereto first, second, third and fourth output signal components such that,
- the sum of the first and second output components is substantially linearly proportional to the first input component and the sum of the third and fourth output components is substantially linearly proportional to the second input component and,
- the first and second output components are related to each other in a controllably variable ratio and the the third and fourth output components are related to each other in substantially the same ratio,
- means to derive from said first to fourth output components an output signal which is a function of a product of the input signal and a term including the ratio, and
- control means responsive to said first to fourth output components and to a further input signal to produce a control signal, to which the apparatus is responsive to adjust the ratio such that there is a determinable relationship between said term and the further input signal,
- whereby a first multiplicand can be represented by the first input signal, a second multiplicand can be represented by said further input signal and the product of the first and second multiplicands can be represented by said output signal.

Preferably the sum of the first and second input signals is equal to a predetermined value.

According to a second aspect of the invention, there is provided a method of performing an analogue multiplication using apparatus arranged to receive an input signal represented by a difference between first and second input signal components and to produce in response thereto, first, second, third and fourth output signal components such that the sum of the first and second output components is substantially linearly proportional to the first input component and the sum of the third and fourth output components is substantially linearly proportional to the second input component, the first and second output components being related to each other in a controllably variable ratio and the third and fourth output components being related to each other in substantially the same ratio, comprising the steps of

- deriving from said first to fourth output components an output signal which is a function of a product of the input signal and a term including the ratio,
- deriving from said first to fourth output components and a further input signal, a control signal to which the apparatus is responsive to adjust the ratio such that there is a determinable relationship between said term and the further input signal,
- using the first input signal to represent a first multiplicand,
- using the further input signal to represent a second multiplicand,
- and using the output signal to represent the product of said multiplicands.

Figure 2:
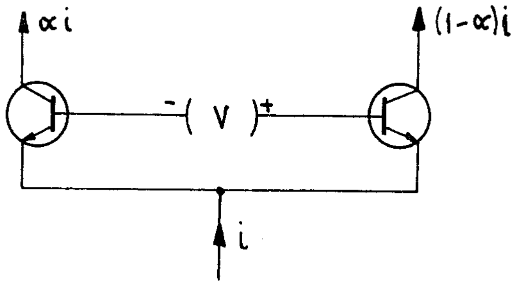
Figure 3:
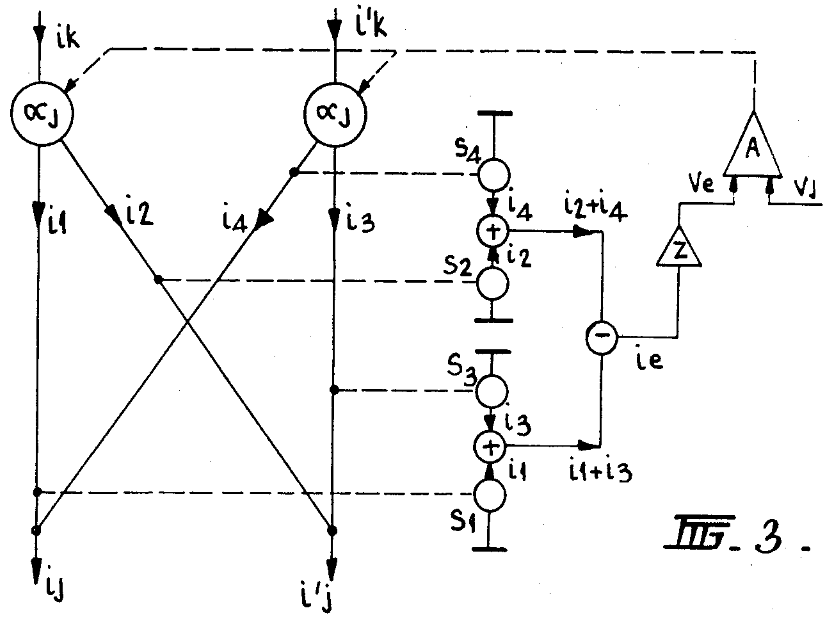
Figure 4:
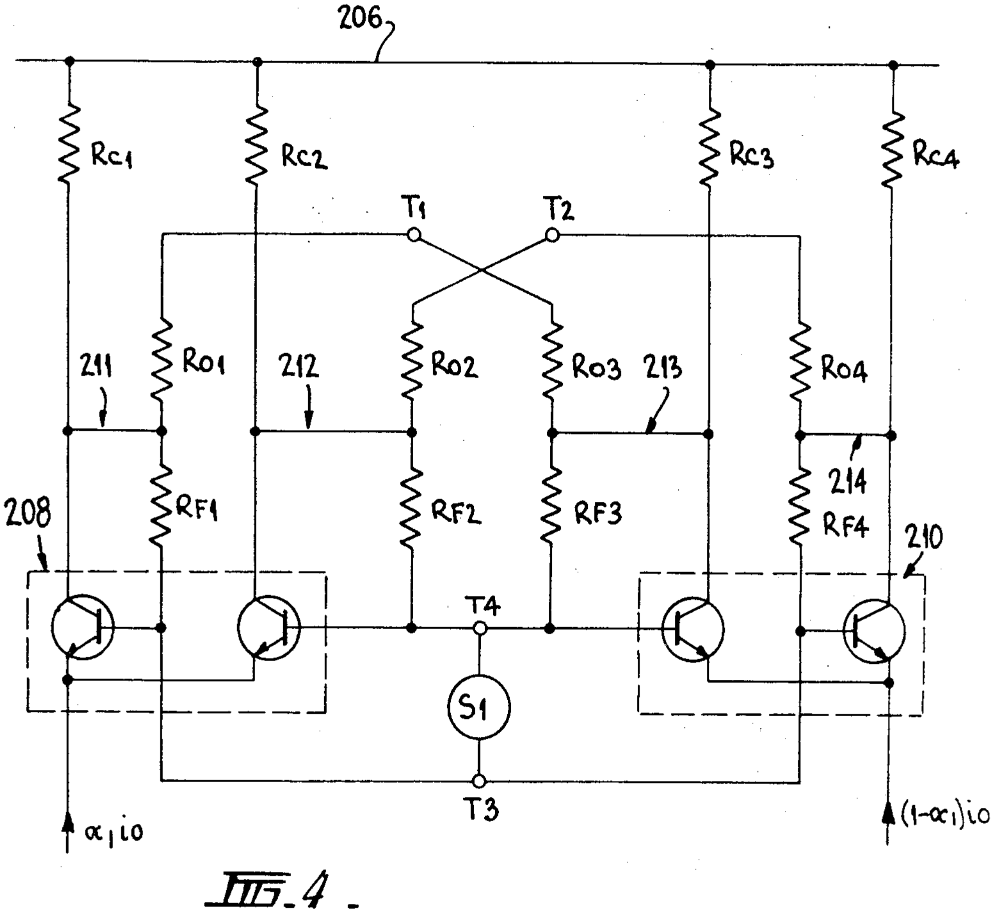
Figure 5:
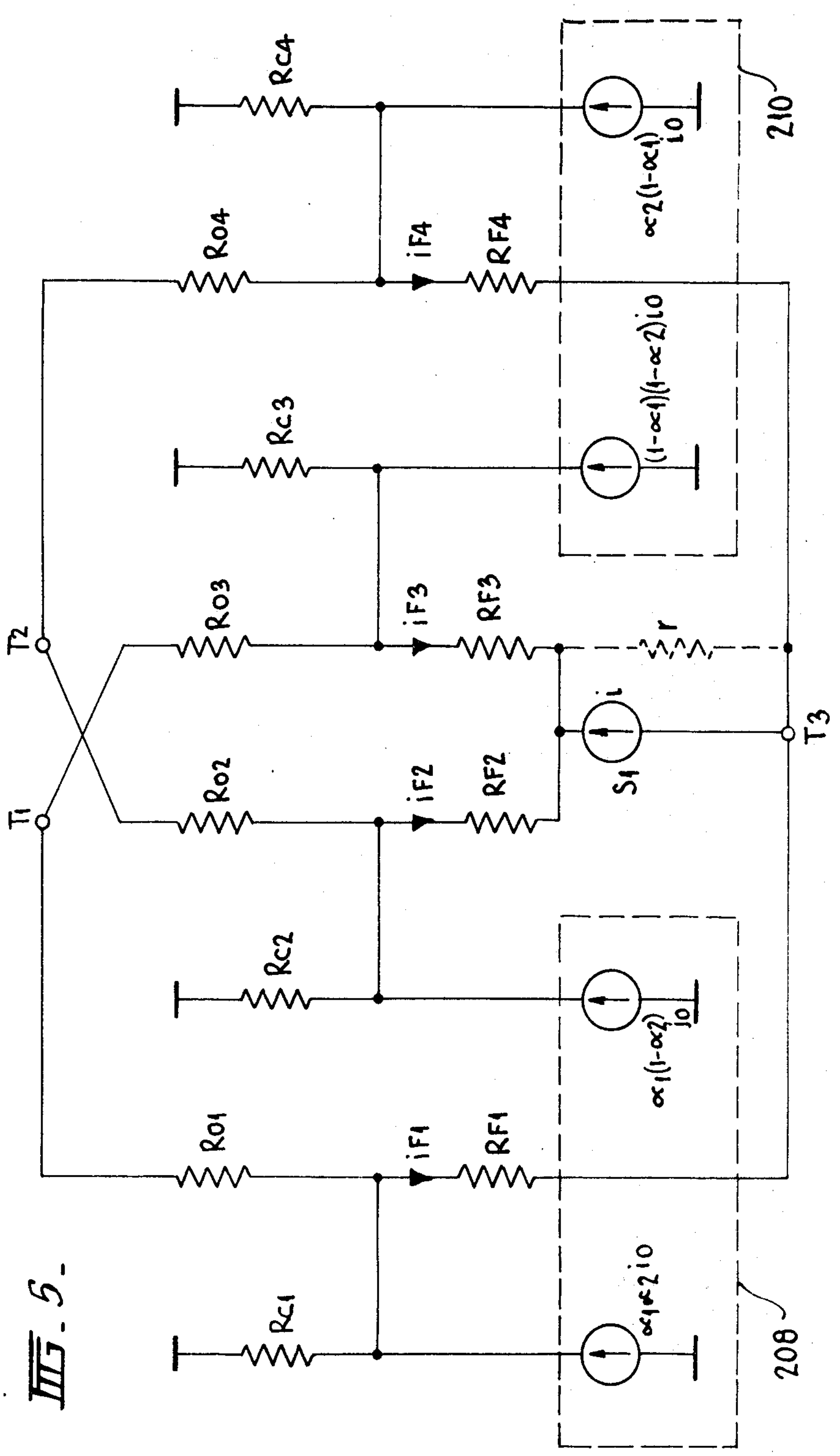
Figure 6:
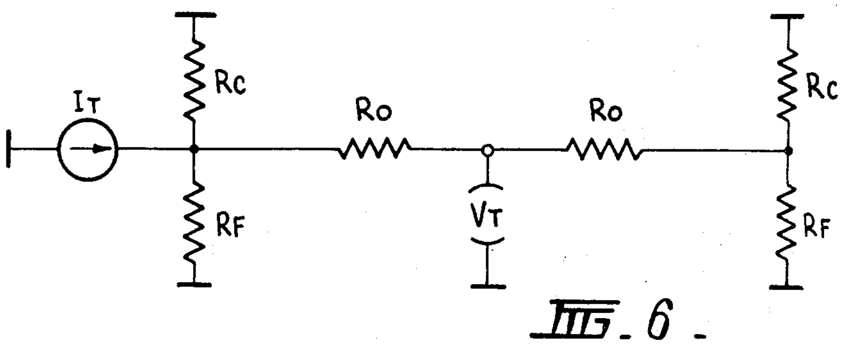
Figure 7:
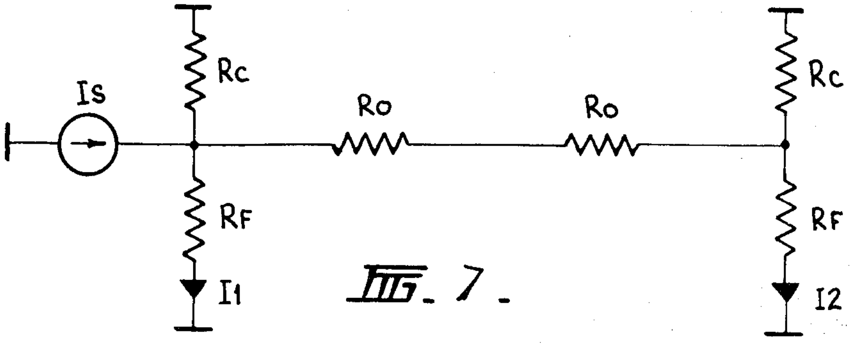
Figure 8:
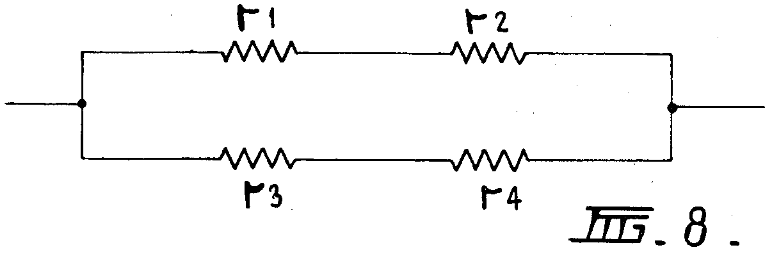
Figure 9:
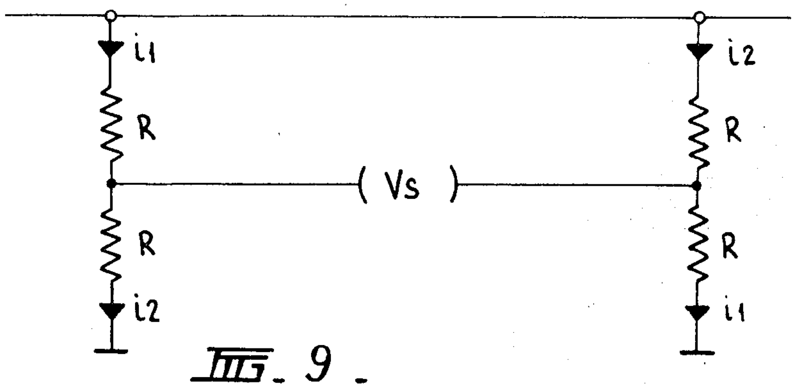
Figure 10:
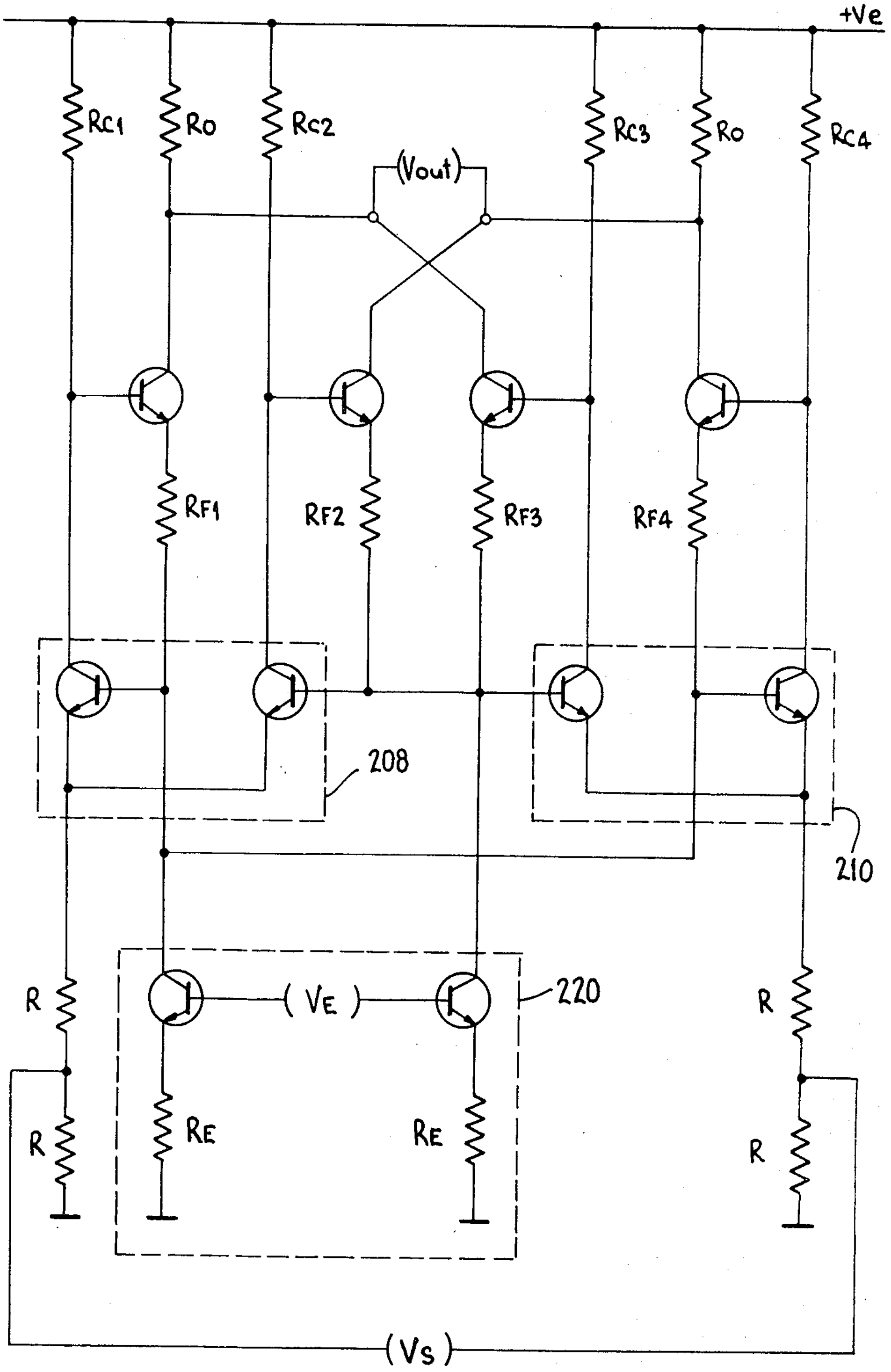

In order to give a clear understanding of the invention, some embodiments thereof will now be described with reference to the accompanying drawings, in which:

FIG. 1, including FIGS. 1A, 1B and 1C, is a diagram representing a known type of multiplier, FIG. 2 is a diagram representing a current splitting device for use in the multiplier of FIG. 1, FIG. 3 is a diagram of one form of a stage of a multiplier in accordance with the invention, FIG. 4 is a diagram of an alternative form of a stage of a multiplier in accordance with the invention, FIG. 5 is an alternative representation of the circuit of FIG. 4 for use in analysis of the circuit, FIG. 6 to 8 are representations of portions of the circuit of FIG. 5 for use in analysis thereof, FIG. 9 is a diagram of a first stage of a multiplier in accordance with the invention, and FIG. 10 is a diagram of a multiplier incorporating stages as shown in FIGS. 4 and 9.

DERIVATION OF BASIC EQUATIONS

The electronic N-stage multiplier diagrammatically illustrated in FIG. 1 is not in accordance with the invention, but is being used to illustrate the derivation of the basic multiplying equations.

FIG. 1 is divided into three parts labeled A, B and C respectively. Part A illustrates the first, or input, stage and the second stage of the multiplier, part B illustrates two successive intermediate stages labeled $j$ and $k$ respectively and part C illustrates the $n$th, or output, stage. The input stage is of a special construction, but the remaining stages are of the same general construction which will be described with reference to the second stage, and analyzed with reference to the $j$th and $k$th stages.

As seen in part A of FIG. 1, the input stage comprises a current splitting device 100 having an input 102, and the device splits the input current between its outputs such that a fraction $\alpha_1$ of the input current is passed to output 104 and a fraction $(1-\alpha_1)$ to output 106. The output signal $I_{10}$ of the input stage, which is the same as the input signal $I_2$ to the second stage is given by equation 1.

Equation 1.

$$I_{10}=I_2=\alpha_1 Io-(1-\alpha_1)Io$$

The signals are represented by the difference between two signal currents, or in the more general case, between two signal components.

The second stage of the multiplier comprises a pair of matched current-splitting devices 108, 110. Device 108 has an input (to which is fed current $\alpha_1 Io$ from the first stage), and a pair of outputs labeled 112, 114. Device 110 has an input (to which is fed current $(1-\alpha_1)Io$ from the first stage), and a pair of outputs 116, 118. Elements 108, 110 are arranged such that a fraction $\alpha_2$ of their respective input currents is passed to outputs 112 and 118 and a fraction $(1-\alpha_2)$ of their respective input currents is fed to outputs 114, 116. Output 112 is connected to output 116 and output 118 is connected to output 114. Accordingly, the output from the second stage is made up of two currents $i_2$ and '$_2$ ' respectively. The resultant output signal $(I_{20})$ from the second stage is given by equation 2.

Equation 2.

$$I_{20}=i_2-i'_2$$

The relationship between this output signal and the input signal $I_2$ will now be examined in the general case with reference to FIG. 1B. The latter shows the $j$th and $k$th stages of the multiplier, the output signal $(I_{ko})$ from the $k$th stage, and the input signal $I_j$ to t he $j$th stage being given by Equation 3.

Equation 3.

$$I_{ko}=I_j=i_k-i'_k$$

The current splitting devices of the $j$th stage split current $i_k$ into components $i_1$ and $i_2$, and current $i_k$ into components $i_3$ and $i_4$. The outputs of the current-splitting devices are cross-connected as in the second stage to give two outputs from the stage carrying currents $i_j$ and $i'_j$ respectively. The various currents entering, within and leaving the stage are related by the equations of Set A.

SET A $$i_1=\alpha_j i_k \qquad i_2=(1-\alpha_j)i_k$$
$$i_4=(1-\alpha_j)i'_k \qquad i_3=\alpha_j i'_k$$
$$i_j=i_1+i_4 \qquad i'_j=i_2+i_3$$

$$\text{Output signal from stage } (I_{jo})=i_j-i'_j$$
$$=\alpha_j i_k+(1-\alpha_j)i'_k-(1-\alpha_j)i_k-\alpha_j i'_k$$
$$=(i_k-i'_k)(2\alpha_j-1)=I_j(2\alpha_j-1)$$

It is seen therefore that the output signal from any stage is the product of the input signal and a quantity dependent upon the ratio in which the input currents are split. It should be noted however that this ratio is not $\alpha_j$ but $\alpha_j:(1-\alpha_j)$. If appropriate equations are developed for the first stage, the same relationship will be found to hold true.

Since the output from any stage is independent of the characteristics of the adjacent stages, it can be seen that the output signal ($Ino$from the $n$th stage is related to the input current ($Io$) to the first stage by equation 4.

Equation 4.

$$Ino=Io(2\alpha_1-1)(2\alpha_2-1) \quad (2\alpha_j-1) \quad (2\alpha_n-1)$$

This equation is of the general form:

$$Z=X\cdot Y_1\cdot Y_2\cdot \quad Y_j \quad Y_n$$

and hence it is possible to employ the multiplier of FIG. 1 to obtain an output signal $I_{no}$ representative of the multiplication of quantities represented by $(2\alpha_1-1)$ etc., the term $I_o$ being a constant scale factor in the multiplier output.

In order to transform another quantity into a value of $(2\alpha_j-1)$ however, it is necessary to be able to control the value of $(2\alpha_j-1)$ in terms of some control input variable, for example current or voltage. The relationship between the control input variable and $(2\alpha_j-1)$ should preferably be linear, for ease of adjustment to different values of the quantity to be multiplied, and should be independent of other possible variables in the system.

PRACTICAL REALIZATION OF THE KNOWN MULTIPLIER

Consider, however, a multiplier as shown in FIG. 1 and in which the current-splitting devices of each stage are each made up of a pair of matched transistors, as illustrated in FIG. 2. The transistors have a common input-receiving current $i$ and are associated with respective outputs so as to divide the input current between the outputs in the ratio $\alpha/1-\alpha$. Then, $\alpha$ is given by equation 5 and $(2\alpha-1)$ by equation 6:

Equation 5

$$\alpha=\frac{1}{1+\exp\frac{qv}{KT}}$$

Where $q$ = electronic charge, $v$ = voltage applied between the bases of the transistors, $k$ = Boltzmann's constant, $I$ = absolute temperature.

Hence,

Equation 6

$$2\alpha-1=\frac{1-\exp\frac{qv}{KT}}{1+\exp\frac{qv}{KT}}=\tan\text{h}\left(\frac{-qv}{2KT}\right)$$

Theoretically therefor, since $(2\alpha-1)$ varies with voltage $v$ the latter could be used as a control input to the stage representative of the quantity to be multiplied. If the dependence of $(2\alpha-1)$ upon $v$ is plotted, however, it will be found to be far from linear except over a small range near the origin. Furthermore, it will be noted that $(2\alpha-1)$ is also dependent upon $I$, and hence, complicated arrangements are required to correct for temperature variations.

MODIFICATION OF KNOWN MULTIPLIER BY NEW THEORY

Consider, however, the circuit of FIG. 3 which shows the $j$th stage of an N-stage multiplier in accordance with the invention. In the stage illustrated in FIG. 3, four suitable current sources $S_1$ to $S_4$ are arranged to produce currents representing the currents in respective outputs of the current-splitting devices, as indicated by the dotted lines coupling the current sources to respective outputs.

For convenience, the currents produced by the sources are shown equal to the currents which they represent but this is not necessary provided proportionality is maintained. The currents produced by the sources are summed and differenced as illustrated in FIG. 3 to give a single current, $i_e$ the value of which is given by equation 7.

Equation 7.

$$i_e=(i_1+i_3)-(i_4+i_2)$$

By means of the equations of Set A, this may be converted to:

Equation 8.

$$i_e=i_k[\alpha_j-(1-\alpha_j)]+i_k'[\alpha_j-(1-\alpha_j)]=I_e(2\alpha_j-1)$$

Where $I_e=i_k+i_k'=i_{k-1}+i_{k-1}'=Io$ = constant, if attenuation factors are ignored.

Current $i_e$ is converted to a voltage $v_e$ by transresistance $z$, so that:

Equation 9. $V_e=zIo(2\alpha_j-1)$

Voltage $V_e$ is fed to a difference amplifier of gain A and compared with an input voltage $v_j$. The output of the amplifier is fed to the current-splitting devices to control $\alpha_j$ so that any difference between $v_e$ and $v_j$ is reduced to zero.

Substituting $v_j$ for $v_e$ in equation 9 gives

Equation 10.

$$(2\alpha_j-1)=v_j/zIo$$

It will be noted therefore that there is a linear relationship between $(2\alpha_j-1)$ and $v_j$, and that the relationship is independent of other variables in the system because both $Z$ and $Io$ are constants. Temperature variations are allowed for by the feedback loop comprising the outputs from the current-splitting devices, the coupled-current sources, the summing and differencing network, the difference amplifier and the control input leads to the splitting devices.

PRACTICAL REALIZATION OF NEW MULTIPLIER

Consider once again the arrangement of matched transistors shown in FIG. 2, the voltage $v$ this time being the control voltage (normally zero) applied by the difference amplifier A. The relations of Set B now hold true for the closed loop.

Set B.

Equation 6 may be expressed in power series form as:

$$2\alpha-1=\frac{-qv}{2KT}\left[1-\frac{1}{6}\frac{(qv)}{2KT}+\ldots\right]=\frac{-qv}{2KT}(1-\epsilon)$$

where $$\epsilon=\frac{1}{6}\cdot\frac{qv}{2KT}\ldots$$

$\epsilon$ represents a deviation from linearity.

Hence for stage $j$ $$v=\frac{-2KT(2\alpha_j-1)}{q(1-\epsilon)}=A(v_j-v_e)=A[v_j-zIo(2\alpha_j-1)]$$

from Equation 6.

Hence $$2\alpha_j-1=\frac{v_j}{zIo\dfrac{-2KT}{qA(1-\epsilon)}}$$

and if $A$ is sufficiently large, this reduces to $$2\alpha_j-1\ \ v_j/zIo$$

which is the linear relationship sought. $z$ and $Io$ are accurately determinable constants, and hence $2\alpha_j-1$ is determinable by means of $v_j$ which functions as the control input voltage to the stage. The accuracy of the approximation is increased with increased gain of the difference amplifier.

Thus, for the $j$th stage, the output current $I_{jo}$ is given by equation 11.

Equation 11.

$$I_{jo}=I_j\cdot v_j/zIo$$

and for N-stages:

Equation 12.

$$I_{no}=Io\cdot\frac{v_1\cdot v_2\cdot v_3\cdot\ \ldots\ v_n}{(zIo)n}$$

In practice, some allowance would have to be made for attenuation.

The circuit illustrated in FIG. 3 is operable but contains a large number of functional blocks and would probably be uneconomic in practice. FIG. 4 however, shows a more practical form of multiplier stage in which this difficulty is avoided.

FIG. 4 illustrates the second stage of a two-stage multiplier. The stage comprises a pair of current-splitting devices shown inside respective dotted-line blocks 208 and 210. Each device comprises a matched pair of transistors connected in a common emitter configuration and with their collectors connected via respective resistors $R_{c1}$ to $R_{c4}$ to a line 206, to which a positive potential is applied in use. The input signal components form the first stage $\alpha_1 i_o$ and $(1-\alpha_1)i_o$ are fed to devices 208 and 210 respectively. Device 208 has a pair of outputs 211, 212 and device 210 has a similar pair of outputs 213, 214. These outputs are cross-connected via respective resistors $R_{o1}$ to $R_{o4}$, so that outputs 211 and 213 are joined at terminal $T_1$ and outputs 212 and 214 are joined at terminal $T_2$. The stage output voltage is taken from these terminals. The outputs of the devices are also interconnected via respective resistors $R_{F1}$ to $R_{F4}$ so that outputs 211 and 214 are joined at terminal $T_3$ and outputs 212 and 213 are joined at terminal $T_4$. Resistors $R_{F1}$ to $R_{F4}$ each have the same value, the different subscripts being used only to indicate which output the resistor is associated with. The same remark applies to Resistors $R_{C1}$ to $R_{C4}$ and Resistors $R_{o1}$ to $R_{o4}$.

It will be seen that if terminals $T_3$ and $T_4$ were short circuited, the current flowing between them would depend upon the difference between the sum of the currents derived from outputs 211, 214 via respective resistors $R_{F1}$ and $R_{F4}$ and the sum of the currents derived from outputs 212, 213 via respective resistors $R_{F2}$ and $R_{F3}$. On this current, there is superimposed a control input current determined by a suitable current source $S_1$ connected between terminals $T_3$ and $T_4$.

It will be noted also that any signal resulting from this arrangement is connected across the transistors of device 208 is opposite senses. That is, current flowing from terminal $T_4$ to terminal $T_3$ is fed into one transistor of device 208 via the base and into the other via the emitter. Device 210 is similarly connected across terminals $T_3$ and $T_4$. Hence, any resultant signal between those terminals affects the transistors of each or either device in equal and opposite senses so as to reduce the resultant signal to zero.

For a more rigorous analysis of the circuit, reference may be had to FIG. 5 which shows an approximate small signal equivalent circuit of FIG. 4. In FIG. 5, the transistors of FIG. 4 have been replaced by their equivalent current sources, input source $S_1$ is assumed to supply a current $i$ and resistance $r$ is an equivalent resistance derived from a consideration of the emitter-base input resistances of the transistors. An expression for $r$ will be derived in the course of the following description.

In the analysis, it will be assumed that the voltage appearing across resistance $r$ is so small as to have a negligible effect on the circuit as a whole, that is, the potentials $v_3$ and $v_4$ of terminals $T_3$ and $T_4$ are substantially equal. Hence, by superposition and by reason of the symmetry of the network, the following relations of Set C hold true:

SET C.

$$v_3=z_1\alpha_1\alpha_2 i_o=z_1(1-\alpha_1)\alpha_2 i_o+z_2\alpha_1(1-\alpha_2)i_o+z_{2}21\alpha-\alpha_1)(1-\alpha_2)i_o$$

$$v_4=z_2\alpha_1\alpha_{20}+z_2(1-\alpha_1)\alpha_2 i_o+z_1\alpha_1(1-\alpha_2)i_o+z_1(1-\alpha_1)(1-\alpha_2)i_o$$

where $z_1$ and $z_2$ are transfer functions dependent upon $R_o$, $R_f$ and $R_c$ only.

Hence, $$v_3+v_4=2v_3=2v_4=(z_1+z_2)i_o$$

$$v_3=v_4=\frac{z_1+z_2}{2}i_0$$

Which is a constant for constant input current.

Terminals $T_3$ and $T_4$ may therefore be considered as being normally at zero signal potential.

The output voltage ($v$ out ) is given by $(v_1-v_2)$, the difference between the potentials at terminals $T_1$ and $T_2$. By reason of the result obtained in Set C, these potentials may be calculated by a consideration of the configuration shown in FIG. 6, in which, for each terminal, the system is reduced to a single current source, producing a current $I_T$, and acting through a network of resistors to produce a potential $v_T$ at a location in the network equivalent to the terminal. For the purposes of this general diagram, the numeral subscripts on the resistor references have been omitted, so that they are referred to simply as $R_c$, $R_o$ and $R_F$. Application of this general configuration to the circuit of FIG. 5 gives the relations of Set D.

SET. D.

For terminal $T_1$:

$$I_T=i_0[\alpha_1\alpha_2+(1-\alpha_1)(1-\alpha_2)]$$

$$v_T=v_1=z_0 I_T$$

where $$z_0=\frac{R_F R_o}{2(R_F+R_o)}$$

For terminal $T_2$:

$$I_T = I_o[\alpha_2(1-\alpha_1)+\alpha_1(1-\alpha_2)]$$

$$v_T = v_2 = z_o I_T$$

Hence,

Equation 13, $$v\ \text{out} = v_1 - v_2 = z_0 i_0[\alpha_1\alpha_2 + (1-\alpha_1)(1-\alpha_2) - \alpha_2(1-\alpha_1) - \alpha_1(1-\alpha_2)$$

$$= z_0 i_0 (2\alpha_1 - 1)(2\alpha_2 - 1)$$

$$= \frac{R_F R_c i_o}{2(R_F + R_c)}(2\alpha_1 - 1)(2\alpha_2 - 1)$$

It is now necessary to determine the dependence of $(2\alpha_2-1)$ upon the control input current $i$. From the first equation of Set B, Equation 14.

$$2\alpha_2 - 1 = -qv/KT(1-\epsilon)$$

Where $v$ = any signal voltage appearing between terminals $T_3$ and $T_4$.

From the circuit shown in FIG. 5.

$$v = (i + i_{F2} + i_{F3})r$$

$$v = (I - i_{F1} - i_{E4})r$$

were $i_{F1}$ to $i_{F4}$ are the currents flowing through resistors $R_{F1}$ to $R_{F4}$ respectively and are referred to in general as currents $i_F$.

Hence,

Equation 15.

$$v = r/2(2i + i_{F2} + i_{F3} - i_{F1} - i_{F4})$$

Currents $i_F$ may be deduced by reference to the configuration shown in FIG. 7 in which the numerical subscripts on the resistors have again been omitted. In FIG. 7 the current source-producing current J represents any one of the four transistors and it will be seen that each transistor contributes two components, $I_1$ and $I_2$, to the currents $i_F$. Components $I_1$ and $I_2$ may be represented as proportions of current $I_s$ in accordance with the relationships shown in Set E.

SET E $$I_1 = A_1 I_s \quad I_2 = A_2 I_s$$

$$A_1 = \frac{R_o\left(\frac{R_c}{R_F}+1\right)+\frac{R_c}{2}}{R_0\left(\frac{R_c}{R_F}+\frac{R_F}{R_c}+2\right)+R_c+R_F}$$

$$A_2 = \frac{R_c}{(R_F+R_c)\left(2+\frac{2R_o}{R_c}+\frac{2R_o}{R_F}\right)}$$

If $R_o$ is much greater than $R_c$ and $R_F$, then $A_1$ is approximately given by $$\frac{R_c}{R_F+R_c}$$

and $A_2$ is much less than $A_1$.

Applying the results obtained in Set E to the circuit of FIG. 5, the relations of Set F can be deduced:

SET F.

$$i_{F1} = A_1\alpha_1\alpha_2 i_o + A_2(1-\alpha_1)(1-\alpha_2)I_o$$

$$i_{F2} = A_1\alpha_1(1-\alpha_2)i_o + A_2(1-\alpha_1)\alpha_2 i_o$$

$$i_{F3} = A_1(1-\alpha_1)(1-\alpha_2)i_o + A_2\alpha_1\alpha_2 i_o$$

$$i_{F4} = A_1(1-\alpha_1)(\alpha_2 i_o + A_2\alpha_1(1-\alpha_2)i_0$$

Substitution of the equations of Set F in equation 15 gives Equation 16.

$$v = r\left[i - \frac{(A_1-A_2)(2\alpha_2-1)i_0}{2}\right]$$

The equivalent of resistance $r$ is shown in FIG. 8 in which $r_1$, $r_2$, $r_3$ and $r_4$ are the base-emitter input resistances of the four transistors shown in FIG. 4. Resistances $R_1$, $r_2$ are those of the transistors of element 208 and $r_3$, $r_4$ are of the transistors of element 210. From transistor theory, the equations of Set G, can be obtained, it being assumed that the collector-base amplification factor $\beta$ is the same for each transistor:

SET G.

$$r_1 = \beta\frac{KT}{qi_0\alpha_1\alpha_2} \qquad r_2 = \beta\frac{KT}{qi_0\alpha_1(1-\alpha_2)}$$

$$r_3 = \beta\frac{KT}{qi_0(1-\alpha_1)(1-\alpha_2)} \qquad r = \beta\frac{KT}{qi_0\alpha_2(1-\alpha_1)}$$

Hence,

Equation 17.

$$r : \beta\frac{KT}{qi_0\alpha_2(1-\alpha_2)}$$

Substitution of equations 16 and 17 in equation 14 gives Equation 18.

$$(2\alpha_2-1)\left[\frac{A_1-A_2}{2} - \frac{\alpha_2(1-\alpha_2)}{(1-\epsilon)\beta}\right] = \frac{i}{i_0}$$

Provided $\beta$ is large and $\epsilon$ small, equation 16 reduces to: Equation 19.

$$(2\alpha_2-1) = \frac{2i}{(A_1-A_2)i_0}$$

and substitution of equation 19 in equation 13 gives Equation 20

$$v\ \text{out} = \frac{R_c R_F}{R_c+R_F}\,\frac{i}{A_1-A_2}(2\alpha_1-1)$$

This is of the general form required, the output voltage being a quantity representative of the product of two variables $i$ and $(2\alpha_1-1)$, both of which are controllably adjustable to represent the quantities to be multiplied, and certain constants which are calculable and hence can be allowed for in assessing the results.

The stage analyzed above was the second stage of the multiplier. It is not necessary however that the first stage be similarly designed. From the result that $T_3$ and $T_4$ are approximately at zero signal potential, it follows that the transistor emitters are also at zero signal potential. Consider for instance, the configuration shown in FIG. 9, in which a constant potential $E$ is applied across two pairs of series connected resistors $R$, and a variable voltage $V_s$ is applied between the pairs. For this configuration, the equations of Set H hold true:

0003

SET H $$E = Ri_1 + Ri_2 \qquad i_1 + i_2 = E/_R$$

$$Ri_2 = Ri_1 + V_s \qquad (i_1 - i_2) = V_s/_R$$

$$\text{Define } \alpha_1 = \frac{i_1}{i_1+i_2}$$

Then, $$2\alpha_1 - 1 = \frac{i_1-i_2}{i_1+i_2} = \frac{V_s}{E}$$

Hence, $(2\alpha_1-1)$ is determinable by means of input voltage $V_s$ in the desired linear manner.

FIG. 10 shows a two-stage multiplier designed on the above principles. It will be noted also that current source $S_1$ is represented by the device shown in block 220. This device relies on the result, derived above, that the potentials appearing at the terminals of the current source are substantially equal and constant. The current source in block 220 may therefore be considered as analogous to the configuration of FIG. 9.

It will be noted that the theory has assumed throughout that both devices of any one stage divide their input currents in the same ratio. It should be noted however that the ratio is not $\alpha$ but $\alpha/1-\alpha$. In discussing a device as a whole however, it is simpler to refer to the ratio $\alpha/1-\alpha$ than to the fraction $\alpha$.

In practice, the ratio of any one device depends upon the physical characteristics of its transistors. The transistors can be chosen to give ratios which can be accepted as equal with a permissible degree of error, but absolute equality will rarely, if ever, be possible.

As described above, each device comprises a pair of matched transistors. There will therefore be a degree of mismatch between the transistors of each pair and inequality of the ratios of the devices of a stage may then arise because of unequal mismatches of the transistor pairs. If it is assumed therefore that $\Delta V$ is the base-emitter mismatch voltage of one pair of a stage and $\Delta V'$ is the base-emitter mismatch voltage of the other pair, then the divisions of the input currents in the two devices are controlled by voltages which differ by an amount $\Delta V-\Delta V'$. The error voltage could be allowed for by inserting a bias voltage source between the pairs or by inserting suitable bias resistors between the pairs and the input of control current $i$. Neither of these solutions is very practical however, and it is preferable to match the transistors sufficiently closely to give the desired degree of accuracy. Alternatively, the mismatch could be accepted and the resultant errors could be assessed. In such an assessment, it will be necessary to consider two ratios for each stage such that, for the $j$th stage, $$(2\alpha_j-1)=\tanh\frac{-q(V_j-\Delta V)}{2kT}$$

$$(2\alpha_j'-1)=\tanh\frac{-q(V_j-\Delta V^1)}{2kT}$$

The calculation of the error is tedious and since it is not essential to the invention it will not be reproduced. It is sufficient to say that provided the difference between the mismatch voltages is small (and usually it will be of the order of a few millivolts) it is possible to predict the errors induced thereby, and the invention remains useful even though the ratios are not exactly equal.

The invention is not limited to details of the illustrated embodiments. It is not limited to the use of any specific circuit components although transistors are most useful. Further, the principle of the invention is applicable to other than electronic multipliers—for instance, fluid flow dividing devices might be used instead of electrical current dividers, the flow control elements determining the ratios then being, say, variable throttles controllable by the control signal, It is further not essential that the input components be divided to produce the output components, the input components could be used simply as control signals causing suitable apparatus to produce four outputs. If the input components are represented by $S_1$ in and $S_2$ in, and the four output components are represented by $S_1$ out to $S_4$ out respectively, the essential relations are $$S_1\text{ out}+S_2\text{ out}=k_1S_1\text{ in}$$

$$S_3\text{ out}+S_4\text{ out}=k_2S_2\text{ in}$$

where $k_1$ and $k_2$ are constants.

In the case of input "division," $k_1=k_2=1$.

Also $$\frac{S_1\text{ out}}{S_2\text{ out}}=\frac{S_3\text{ out}}{S_4\text{ out}}=r$$

In the cases described above $$r=\frac{\alpha}{1-\alpha}$$

As mentioned above, it is easier in describing the invention to refer to the ratio $r$ than the fraction $\alpha$. The term $(2\alpha-1)$ referred to above can be expressed in terms of $r$ as $$2\alpha-1=r-1/r+1$$

and the output of the $j$th stage is therefore.

$$I_{jo}=I_j\frac{r_j-1}{r_j+1}$$

Hence, the output of the stage is a function of the product of the input and a term involving the ratio. The present invention permits the establishment of a determinable relationship between the term $r-1/r+1$ and a suitable physical input to the multiplier. That relationship can, by means of the present invention, be rendered (*a*) independent of variables other than the ratio and the input, and (*b*) substantially linear.

What is claimed is:

1. Equipment for use in analogue multiplication comprising apparatus to receive first and second input signal components a difference between said first and second input signal components representing a first input signal and the apparatus being arranged to produce in response thereto first, second, third and fourth output signal components such that, the sum of the first and second output components is substantially linearly proportional to the first input component and the sum of the third and fourth output components is substantially linearly proportional to the second input component and, the first output component is related to the second in a controllably variable ratio and the third output component is related to the fourth in substantially the same ratio, means to derive from said first to fourth output components an output signal which is a function of a product of the input signal and a term including the ratio, and control means responsive to said first to fourth output components and to a further input signal to produce a control signal, to which the apparatus is responsive to adjust the ratio such that there is a determinable relationship between said term and the further input signal, whereby a first multiplicand can be represented by the first input signal, a second multiplicand can be represented by said further input signal and the product of the first and second multiplicands can be represented by said output signal.

2. Equipment as claimed in claim 1, wherein said determinable relationship is substantially independent of variables other than the further input signal and the ratio.

3. Equipment as claimed in claim 2, wherein said determinable relationship is substantially linear.

4. Equipment as claimed in claim 1, wherein the sum of the first and second input components is predetermined.

5. Equipment as claimed in claim 1, wherein the control means is responsive to a difference between the sum of the first and third output components and the sum of the second and fourth output components, the control signal being such as to cause adjustment of the ratio to cause said difference to correspond with the further input signal.

6. Equipment as claimed in claim 1, wherein means are provided to derive a first signal representative of the sum of the first and third output components and to derive a second signal representative of the sum of the second and fourth output components, the control means being responsive to a difference between said first and second derived signals.

7. Equipment as claimed in claim 6, wherein the control means comprises superposing means to enable superposition of said further input signal, said first derived signal and said second derived signal, the latter two being superposed in opposition to each other, the control signal being the resultant of said superposed signals.

8. Equipment as claimed in claim 1, wherein the control means comprises means to derive a third signal representative of the difference between the first and second derived signals, and means to compare said third derived signal with said further input signal, the control signal being representative of a difference between the further input signal and the third derived signal.

9. Equipment as claimed in claim 1, wherein the output signal is representative of a difference between the sum of the first and fourth output components and the sum of the second and third output components.

10. Equipment as claimed in claim 9, wherein the means to derive the output signal comprises means to derive a fifth output signal component representing the sum of the first and fourth output components and to derive a sixth output signal component representing the sum of the second and third output components.

11. Equipment as claimed in claim 1, wherein said apparatus comprises a first device having a first input and a first and second outputs, and a second device having a second input and third and fourth outputs, the first device being arranged to receive said first input component via said first input and to produce the first and second output components which leave the device via the first and second outputs respectively, the second device being arranged to receive the second input component via said second input and to produce the third and fourth output components which leave the device via the third and fourth outputs respectively.

12. Equipment as claimed in claim 11, including means fo connect the first output to the fourth so as to obtain a fifth output signal component representing the sum of the first and fourth output components, and means to connect the second output to the third so as to obtain a sixth output signal component representing the sum of the second and third output components, the output signal being represented by a difference between said fifth and sixth output components.

13. Equipment as claimed in claim 11, including means to connect the first output to the third so as to derive a first signal representative of the sum of the first and third output components, and means to connect the second output to the fourth so as to derive a second signal representative of the sum of the second and fourth output components, the control means being responsive to a difference between said first and second derived signals.

14. Equipment as claimed in claim 11, wherein the first device is arranged to divide the first input component to produce the first and second output components, and the second device is arranged to divide the second input component to produce the third and fourth output components.

15. Equipment as claimed in claim 1, wherein said apparatus comprises a first device having a first input to receive said first input component, first and second elements arranged to determine, in response to the control signal, said first and second output components respectively, and first and second outputs by which the first and second output components respectively depart from the device, and comprises also a second device having a second input to receive said second input component, third and fourth elements arranged to determine, in response to the control signal, said third and fourth output components respectively, and third and fourth outputs by which the third and fourth output components respectively depart from the device.

16. Equipment as claimed in claim 15, wherein the arrangement of the elements is such that variation of the control signal causes corresponding variation in one sense of the first and third output components and corresponding variation in the opposite sense of the second and fourth output components.

17. Equipment as claimed in claim 15, wherein each element is such that a small variation in control signal causes a corresponding amplified variation in the output component determined by the element.

18. Apparatus as claimed in claim 1, wherein the signal components are electrical quantities.

19. Equipment as claimed in claim 18, wherein the first and second input components are electrical currents.

20. Equipment as claimed in claim 1, comprising an energizing source arranged to produce a predetermined output signal, and means to derive said first and second input components from said predetermined signal such that the sum of the first and second input components is substantially linearly proportional to the predetermined signal.

21. Equipment as claimed in claimed in claim 20, wherein the means to derive the first and second input components is arranged to divide said predetermined output signal.

22. Equipment for use in analogue multiplication comprising apparatus to receive first and second input signal components, a difference between said first and second components representing a first input signal and said apparatus being arranged to produce in response to said components first, second, third and fourth output signal components such that, the sum of the first and second output components is substantially linearly proportional to the first input component and the sum of the third and fourth output components is substantially linearly proportional to the second input component, and the first output component is related to the second in a controllably variable ratio and the third output component is related to the fourth in substantially the same ratio, means to derive from said first to fourth output components an output signal which is a function of the product of the input signal and a term including the ratio, and control means responsive to said first to fourth output components and to a further input signal to produce a control signal to which the apparatus is responsive to adjust the ratio such that there is a determinable, substantially linear relationship between said term and the further input signal, and said relationship is substantially independent of variables other than the other input signal and the ratio, whereby a first multiplicand can be represented by the first input signal, a second multiplicand can be represented by said further input signal and the produce of the first and second multiplicands can be represented by said output signal.

23. Equipment as claimed in claim 22 wherein the control means is responsive to a difference between the sum of the first and third output components and the sum of the second and fourth output components, the control signal being such as to cause adjustment of the ratio to cause said difference to correspond with the further input signal.

24. Equipment as claimed in claim 22 wherein the output signal is representative of a difference between the sum of the first and fourth output components and the sum of the second and third output components.

25. Equipment for use in analogue multiplication comprising apparatus to receive first and second input signal components, a difference between said first and second components representing a first input signal and said apparatus being arranged to produce in response to said components first, second, third and fourth output signal components such that, the sum of the first and second output components is substantially linearly proportional to the first input component and the sum of the third and fourth output components is substantially linearly proportional to the second input component, and the first output component is related to the second in a controllably variable ratio and the third output component is related to the fourth in substantially the same ratio, means to derive from said first to fourth output components an output signal which is representative of a difference between the sum of the first and fourth output components and the sum of the second and third output components, so that the output signal is a function of the product of the input signal and a term including the ratio, and control means arranged to produce a control signal by comparing a further input signal with a difference between the sum of the first and third output components and the sum of the second and fourth output components, the apparatus being responsive to the control signal to adjust the ratio such that there is a determinable relationship between said term and the further input signal, whereby a first multiplicand can be represented by the first input signal, a second multiplicand can be represented by said further input signal and the product of the first and second multiplicands can be represented by said output signal.

26. Equipment as claimed in claim 25 wherein said relationship is substantially linear and substantially independent of variables other than the further input signal and the ratio.

* * * * *